United States Patent

Akhatovich et al.

[11] Patent Number: 6,010,628
[45] Date of Patent: Jan. 4, 2000

[54] POROUS MEMBRANE WITH LOW STEAM PERMEABILITY

[75] Inventors: Makhmutov Fanil Akhatovich; Kozlova Elena Valentinovna; Vasiljeva Irina Mukhaylovna, all of g. Tula, Russian Federation

[73] Assignee: Iskra Industry Co., Ltd., Tokyo, Japan

[21] Appl. No.: 08/975,991

[22] Filed: Nov. 21, 1997

[30] Foreign Application Priority Data

Nov. 22, 1996 [RU] Russian Federation ............. 96122351

[51] Int. Cl.$^7$ .................................. B01D 29/00
[52] U.S. Cl. ............. 210/500.36; 210/490; 210/500.42; 210/500.38; 96/4; 96/7; 96/11
[58] Field of Search .................. 210/500.27, 500.36, 210/500.38, 500.42, 490; 96/4, 7–11; 95/43–55

[56] References Cited

U.S. PATENT DOCUMENTS

| | | | |
|---|---|---|---|
| 4,869,859 | 9/1989 | Itoh et al. | 210/500.36 |
| 4,900,626 | 2/1990 | Fabre | 428/398 |
| 5,013,339 | 5/1991 | Mahoney et al. | 264/41 |
| 5,354,587 | 10/1994 | Abayasekara | 210/500.36 |

FOREIGN PATENT DOCUMENTS

| | | | |
|---|---|---|---|
| 26 32 185 | 1/1977 | Germany . | |
| 0093734 | 6/1983 | Japan | 210/500.42 |
| 3175606 | 7/1988 | Japan | 210/500.42 |
| 2017761 | 5/1991 | Russian Federation . | |

OTHER PUBLICATIONS

Patent Abstracts of Japan, vol. 17, No. 145, Mar. 24, 1993 & JP 04 312771 A (Toshiba Battery Co., LTD.), Nov. 4, 1992. Abstract.

Database WPI, Week 9218, Derwent Publications Ltd., London, GB; AN 92–148409, XP002078746 & SU 1 327 518 A (Synth. Resin. Res. Ins.), Jul. 30, 1991. Abstract.

Database WPI, Week 9525, Derwent Publications, Ltd., London, G.B.; AN 95–188623 & JP 07 105991 A (Matsushita Denki Sangyo KK), Apr. 21, 1995. Abstract.

*Primary Examiner*—Ana Fortuna
*Attorney, Agent, or Firm*—Foley & Lardner

[57] ABSTRACT

A membrane for dry metal-air chemical current sources which posses high oxygen permeability and provide high barrier properties toward water vapor. The invention includes a semipermeable porous asymmetric membrane based on vinylidene fluoride polymer comprising copolymer of vinylidene fluoride with tetrafluoroethylene at 8–70% mass content of tetrafluoroethylene, the membrane pore size being 0.0015–0.030 $\mu$m, and the volume porosity being 35–60%, wherein said asymmetric membrane has a more dense porous structure on one side of the membrane than on another side of said membrane, and wherein the water vapor permeability is not more than 0.178 mg/h. cm$^2$ and the oxygen permeability is not less than 2.70 m$^3$/m$^2$ atm h.

4 Claims, No Drawings

POROUS MEMBRANE WITH LOW STEAM PERMEABILITY

BACKGROUND OF INVENTION

1. Field of Invention

The present invention relates to the field of producing membranes for chemical current sources, in particular, membranes with high oxygen permeability and at the same time with high barrier properties towards steam. Membranes of such type may be applied to dry metal-air current sources of various kinds: zinc-air, lithium-air, aluminum-air, etc.

2. Related Art

At the moment, in chemical current sources (CCS) of the above type, either calibrated holes for atmospheric air flow to air electrode, or separating materials based on polyvinylchloride or polyolefines similar to those used in accumulators are applied. Such separators are proposed, for instance, in Russian Patent No. 2017761 (porosity of 65.5–85.5% and pores size up to 1.03–8.6 μm, and made of polyethylene with perchlorovinyl resin additive). However, though they, as a rule, have a sufficient oxygen permeability, they possess too high a steam permeability, thus they do not provide a steady operation of a metal-air CCS.

Hollow-fiber form membranes for air drying are known [U.S. Pat. No. 4,900,626]. They comprise a microporous membrane-support of polyvinylidene fluoride or other polymers, and coating based on bridged cross-linked polydimethylsiloxane which does not overlap the whole porous support structure, the surface density of coating on PVDF support being 9 g/m$^2$. The porosity of membrane-support is 60%, size of the dense layer pores is 1–20 μm, and that of loose layer is up to 100 μm. Water vapor permeability of membranes with such porous structure is $260\times10^{-5}$ cm$^3$/cm$^2$s/cmHg, Hg, that is more than one order higher than the required level, and oxygen permeability is $3.71\times10^{-5}$ cm$^3$/cm$^2$s/cmHg, Hg, that is considerably lower than the required level.

The membranes nearest to the proposed invention are semipermeable asymmetric membranes of polyvinylidene fluoride [EP 0,330,072] which are characterized by an average porosity of more than 50% (preferably more than 80%), thickness from 50 up to 250 μm (preferably from 70 up to 120 μm), an average pore diameter from 0.01 μm up to 1 μm (preferably from 0.1 up to 0.3 μm). However, their porosity and pores dimension are too high, and therefore the membranes do not possess barrier properties towards steam which are necessary for the effective operation of dry metal-air current sources. Thus, in Example 4 of the patent for the option of membrane on a fabric support the steam permeability value is 4400 g/m$^2$ for 24 h, or about 18 mg/cm$^2$·h, that is two decimal orders higher than the maximum allowable steam permeability level.

Membranes for dry metal-air chemical current sources should meet specific requirements for permeability, in particular, a high permeability towards oxygen from atmosphere inside CCS in order to provide oxygen to the air CCS electrode, and at the same time a low permeability towards steam both from outside to inside, and from inside to outside, providing independence of CCS characteristics on the ambient atmosphere humidity, preventing electrode corrosion and keeping an optimum consistency of the paste electrode. The required characteristics of membrane permeability are defined by the following values:

Oxygen permeability—not less than 4.56 cm$^3$/min·cm$^2$. (2,70 m$^3$/m$^2$·h)

Steam permeability—not more than 0.178 mg/h·cm$^2$.

Thus, the requirements for membranes for dry metal-air CCS are of specific nature and membranes produced for some other fields of application are not able to meet the said requirements.

SUMMARY OF THE INVENTION

The object of this invention is the creation of hydrophobic membranes on a fluoroplastic base which satisfy the requirements of dry metal-air CCS by the main characteristics of mass transfer: high oxygen permeability, not less than 4.56 cm$^3$/min·cm$^2$ (or 2.70 m$^3$/m$^2$·h) and low steam permeability, not more than 0.178 mg/h·cm$^2$.

The above object is achieved by the proposed membrane based on copolymers of vinylidene fluoride with tetrafluoroethylene at 8–70% mass content of tetrafluoroethylene in the copolymer, asymmetric structure with pores size from 0.0015 μm to 0.030 μm, and volume porosity from 35 up to 60%. In order to improve the stability, the membrane may additionally contain on the dense layer side a surface layer of polydimethylsiloxane, polyvinyltrimethylsilane, polytrimethylsilylpropyne, polyvinylidene fluoride, or its copolymer with tetrafluoroethylene at the surface density of the layer not more than 5 g/m$^2$. In order to increase the membrane strength it may comprise additionally a large-pore fibrous support of polypropylene or polyamide at mass ratio of the fibrous support and fluoroplastic membrane layer 1:(0.3–1.5).

DETAILED DESCRIPTION

Material of the proposed asymmetric membrane comprises copolymers of vinylidene fluoride with tetrafluoroethylene at mass content of the latter from 8 up to 70%. At a higher content of tetrafluoroethylene the copolymer solubility in ketone solvents, i.e. a possibility of formation of membranes from a solution is lost. At a lower content of tetrafluoroethylene the physical-mechanical properties of the copolymer does not differ from those of a pure polyvinylidene fluoride which is too hard to form a stable microporous structure with low pores size as defined in the present invention. An asymmetric membrane structure is characterized by the fact that its one side is more lustrous and has more dense porous structure, and the other one is more dull and has more loose structure. While the required parameters of steam permeability are provided only when the membrane's lustrous side faces the flow; otherwise the steam permeability value is 1.5–2 times higher. When membrane pore size is less than 0.0015 μm, and at volume porosity less than 35%, the membrane oxygen permeability becomes lower than the required level of 2.7 m$^3$/m$^2$·h atm (in the latter case the porosity is mainly of closed type). If the dimensions of the membrane pores exceed 0.030 μm or their volume porosity is more than 60%, then steam permeability value exceeds the maximum allowable value of 0.178 mg/h·cm$^2$. The limiting value of surface density of the membrane coating with a modifying layer of not more than 5 g/m$^2$ is defined based on the fact that at a good compatibility of the coating and base materials, and good film-forming properties of polymers used for the coating at the pointed coating density it is spread uniformly on the membrane surface but at the same time does not form a continuous diffusion layer overlapping pores of the membrane-support. Application of large-pore fibrous supports of polypropylene or polyamide at mass ratio of the fibrous support and fluoroplastic membrane layer 1:(0.3–1.5) provides sufficient membrane strengthening necessary for putting it in CCS structure and at the same time saves material.

The structure of membranes with necessary characteristics formed under conditions of casting using polymer solution in ketonic solvent (acetone, methyl ethyl ketone etc.) which also comprises a "bad" solvent or precipitation agent for this polymer; in the given case—water and its mixtures with aliphatic alcohols. Such a molding solution is fed on a lustrous glass plate with a spinneret, and dried under control of the solvent vapor pressure (so called "edry casting" method). This method provides preparation of membranes from vinylidene fluoride copolymers with pores size from 0.030 μm up to 0.008 μm. Membranes possess a prominent asymmetric structure for membranes with the minimum pores the side facing the air atmosphere is characterized by pores size 2.5–3 times lower than that facing the support. In order to produce membranes with pore size lower than 0.008 μm a "wet casting" method is used according to which, after a short drying of the solution on the support, it is introduced together with the support into a bath with a precipitating solution of similar composition (aqueous solution of aliphatic alcohol), and then the casted membrane is dried in air. Membranes characteristics are shown in Table 1.

TABLE 1

| Nos. | Membrane Material | Average Pore Size, μm | Porisity, % vol. | Oxygen Permeability, m³/m² · h | Steam Permeability, mg/cm² · h |
|---|---|---|---|---|---|
| | Dry Casting | | | | |
| 1. | Copolymer VDF-40% TFE | 0.200 | 60 | >30 | 8.9 |
| 2. | Copolymer VDF-40% TFE | 0.020 | 80 | 17 | 4.9 |
| 3. | Copolymer VDF-15% TFE | 0.020 | 45 | 11 | 0.16 |
| 4. | Copolymer VDF-15% TFE | 0.013 | 40 | 6.1 | 0.16 |
| 5. | Copolymer VDF-70% TFE | 0.008 | 35 | 2.7 | 0.12 |
| | Wet Casting | | | | |
| 6. | Copolymer VDF-60% TFE | 0.012 | 60 | 6.7 | 0.17 |
| 7. | Copolymer VDF-55% TFE | 0.008 | 52 | 5.9 | 0.16 |
| 8. | Copolymer VDF-8% TFE | 0.0072 | 44 | 4.5 | 0.14 |
| 9. | Copolymer VDF-40% TFE | 0.0015 | 40 | 2.7 | 0.11 |
| 10. | Copolymer VDF-30% TFE | 0.0010 | 38 | 0.59 | 0.08 |
| 11. | PVDF (according to previous art) | | | 18.0 | |

It can be seen that membranes with claimed characteristics of porous structure provide the required high level of oxygen permeability, and at the same time high barrier properties towards steam. Data in Table 1 show that membranes with the required properties may be produced by both dry and wet casting methods.

In order to increase stability of membranes with a microporous asymmetric structure (especially at heating to 60–70° C. under various deformation types at compacting in the articles for a long-term operation) membranes for dry metal-air CCS should be covered additionally with a layer of hydrophobic film-forming polymer compatible with the fluoroplastic copolymer.

TABLE 2

| Nos. | Membrane Type | Oxygen Permeability, m³/m² · h | Steam Permeability, mg/cm² · h |
|---|---|---|---|
| 12. | PDMSO/Copolymer VDF-15% TFE | 8.8 | 0.15 |
| 13. | Silicone Rubber/Copolymer VDF-15% TFE | 4.3 | 0.17 |
| 14. | PVTMS/Copolymer VDF-15% TFE | 5.8 | 0.16 |
| 15. | PTMSP/Copolymer VDF-15% TFE | 6.4 | 0.13 |
| 16. | Copolymer VDF-40% TFE/Copolymer VDF-15% TFE | 7.5 | 0.11 |

Table 2 shows test results on permeability of modified membranes prepared by introducing of claimed film-forming hydrophobic polymers on the fluoroplastic membrane according to example 3, Table 2.

Polydimethylsiloxane (introduced from diluted 2–3% solutions of oligodimethylsiloxanediol in hexane followed by a chemical cross-linking with tetraethoxysilane in the presence of cold hardening catalyst—tin octoate, or radiation bridging; examples 12 and 13);

Polyvinyltrimethylsilane (introduced from 1–3% solutions in chlorinated hydrocarbons, example 14);

Polytrimethylsilylpropyne from solutions in toluene (example 15);

Copolymer of vinylidene fluoride with 40% tetrafluoroethylene from solution in methyl-ethyl ketone (example 16).

Results shown in Table are obtained after improvement of procedure of introducing each polymer coating so that the surface density of coating does not exceed 5 g/m². It is found out that in this case the modifying polymer does not form a continuous layer, and thus does not cause diffusion resistance to transfer. This is proved by the fact that measurements of the modified membranes permeability towards a gas pair oxygen/nitrogen have not revealed any selective transfer; the selectivity value reaches its maximum of 1.45 for PVTMS/copolymer VDF—40% TFE membranes while an "ideal" selectivity of the above gases for PVTMS is 3.5. The permeability of the modified membranes is slightly decreased comparing to original fluoroplastic membranes, but it still meets the requirements of metal-air CCS. Tests of the modified membrane stability after a long thermal treatment for 96 hours at 70° C. showed that their properties are not changed in fact while the decrease in oxygen permeability of not-modified membranes was 15–20%. Test results reveal the efficiency of surface modification for the preparation of membranes having both a high oxygen permeability and sufficient barrier properties towards steam.

We claim:

1. A semipermeable porous asymmetric membrane based on vinylidene fluoride polymer comprising copolymer of vinylidene fluoride with tetrafluoroethylene at 8–70% mass content of tetrafluoroethylene, the membrane pore size being 0.0015–0.030 μm, and the volume porosity being 35–60%, wherein said asymmetric membrane has a more dense porous structure on one side of the membrane than on another side of said membrane, and wherein the water vapor permeability is not more than 0.178 mg/h·cm².

2. A semipermeable membrane according to claim 1 wherein its more dense side is covered additionally with a layer of polydimethylsiloxane, polyvinyltrimethylsilane, polytrimethylsilylpropyne, polyvinylidene fluoride or its copolymer with tetrafluoroethylene at a surface coating density of not more than 5 g/m$^2$.

3. Semipermeable membrane according to claim 2 wherein it includes additionally a large-pore fibrous support of polypropylene or polyamide at mass ratio of fibrous support and fluoropolymer layer of the membrane 1:(0.3–1.5).

4. Semipermeable membrane according to claim 1 wherein it includes additionally a large-pore fibrous support of polypropylene or polyamide at mass ratio of fibrous support and fluoropolymer layer of the membrane 1:(0.3–1.5).

* * * * *